Patented Sept. 22, 1925.

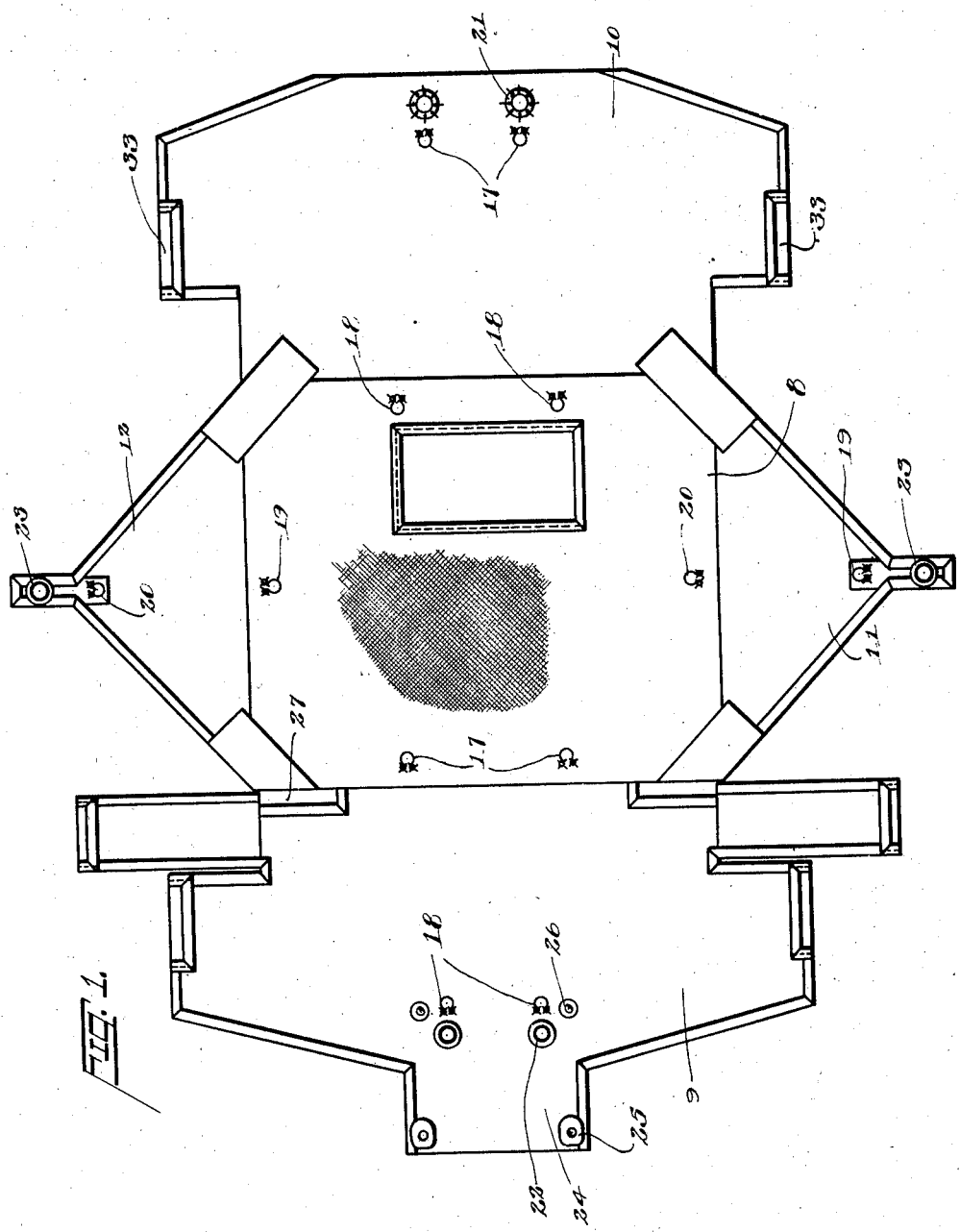

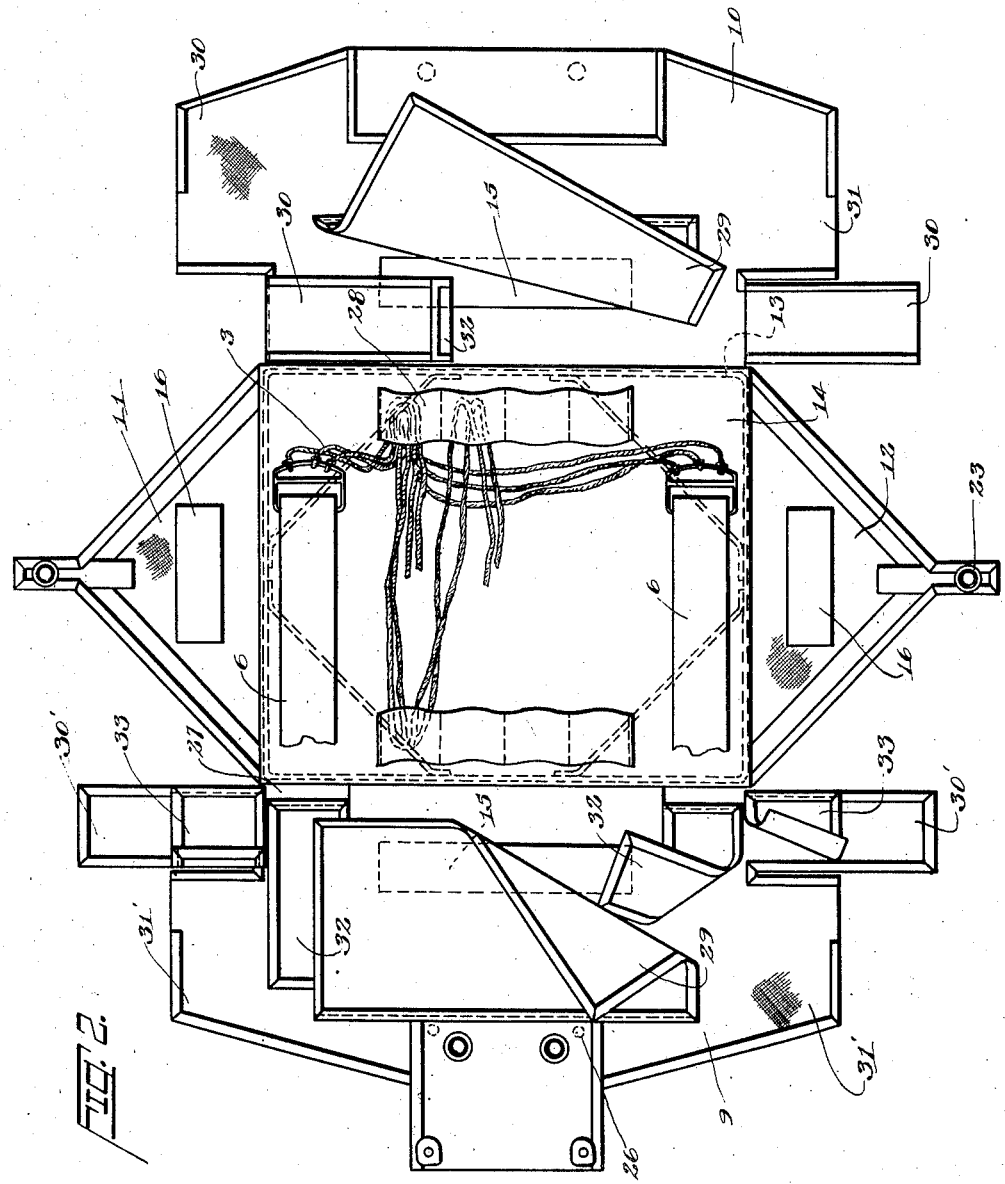

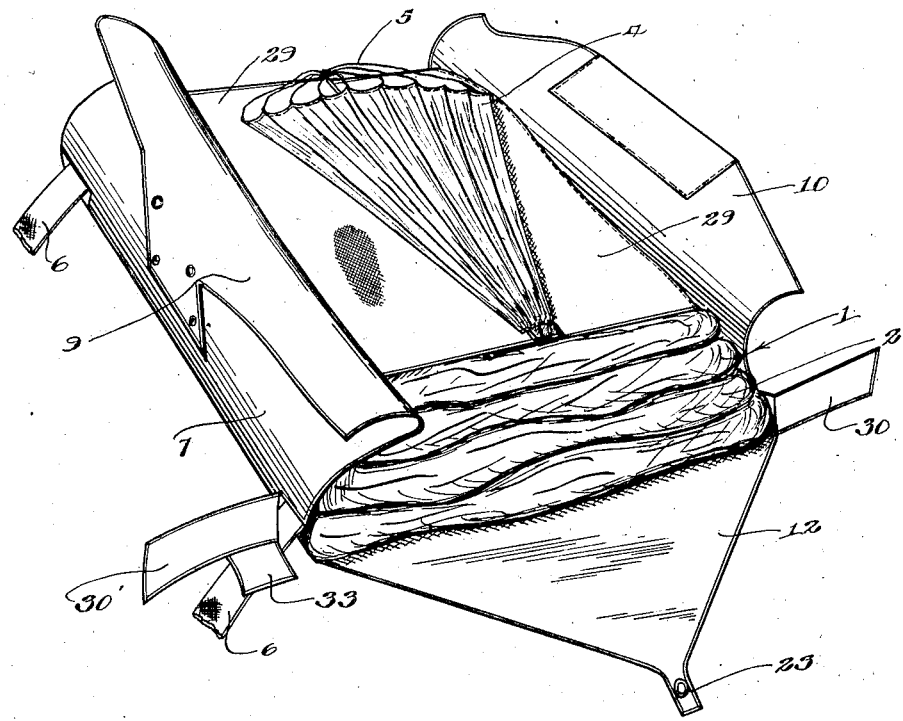

1,554,192

UNITED STATES PATENT OFFICE.

GUY M. BALL, OF DAYTON, OHIO, ASSIGNOR TO IRVING AIRCHUTE COMPANY, INC., OF BUFFALO, NEW YORK, A CORPORATION OF NEW YORK.

PARACHUTE PACK.

Application filed April 18, 1924. Serial No. 707,385.

*To all whom it may concern:*

Be it known that I, GUY M. BALL, a citizen of the United States, residing at Dayton, in the county of Montgomery and State of Ohio, have invented certain new and useful Improvements in Parachute Packs, of which the following is a specification.

This invention relates in general to parachutes, and more particularly to an improved parachute pack of the flexible type such as are carried on the person of the aviator.

The improvements of the present invention are directed toward the provision of a parachute pack in which all danger of the entanglement of various parts of the parachute is avoided, and wherein the construction enables the packing of the parachute in a workmanlike manner to give the pack a snug trim form with nothing to be caught on things when the aviator gets in or out of the cockpit.

With the foregoing objects in view, the invention provides means serving as a partition between the large main parachute and the small pilot parachute so that there is no likelihood of the pilot parachute becoming entangled with the large parachute or fouling with its shrouds, and also provides pockets within the pack into which the shrouds of the main parachute may be tucked. Other provisions for securing a snug, trim pack are the provision of a reinforcing frame in the back of the pack and stiffening means in the flaps at the four sides, also finger holds on the flaps to facilitate tucking the flaps under overlying flaps. A further provision is the cutting on a bias of the flexible material of which the pack is made, which permits the drawing up tight of the flaps over the entire area thereof without leaving edges curled up.

These and other objects of the invention will be made to appear in the accompanying specification and claims and are disclosed in the accompanying drawings, in which:

Fig. 1 is a view of the outside surface of the parachute pack unfolded and spread out.

Fig. 2 is a similar view of the inside of the pack, only a portion of the parachute shrouds and the ends of the body harness straps of the parachute being shown, and other portions of the pack being folded over in certain instances to illustrate the construction more clearly.

Fig. 3 is a perspective view of the pack with the large parachute folded and packed therein showing the disposition of the small pilot parachute with respect thereto and all of the flaps opened and laid back to disclose the arrangement.

The type of parachute for which this pack is primarily adapted is the standard type now in use by the U. S. Army and Navy, having the main large parachute 1 consisting of a supporting canopy 2 and shroud lines 3, and a spring-opened auxiliary or pilot parachute 4 connected by means of shrouds 5 and a ring (not shown) with the main parachute. The shrouds 3 are connected to straps 6 extending into the pack from the body harness on the person of the aviator. These provisions are of the standard well known type and require no further explanation.

The parachute pack or container 7 is made of any suitable flexible material which is preferably waterproof, and comprises a mid-portion 8 which constitutes the back of the pack, and end flaps 9 and 10, and side flaps 11 and 12 which fold over the back 8 to retain the folded parachute. The back 8 is reinforced by a wire frame 13 of a rectangular form which defines the edges of the pack. The frame is sewed on the back with a rectangular sheet 14 covering the inside surface of the back 8. Stiffening pieces 15 and 16 are sewed in the flaps to better shapen the pack. Each of the end flaps 9 and 10 and the side flaps 11 and 12 have elastics extending between eyelets 17, 18, 19 and 20 respectively in a manner familiar to the art. The flap 10 is provided with eyelets 21 to receive grommets 22 on the flap 9 when the flaps are folded over the folded parachute. The side flaps 11 and 12 are next folded over so that the eyelets 23 may be engaged over the grommets. A rip cord having a wire end passed through openings in the grommets extends to a convenient point, usually on the body harness, where a ring is provided to enable the aviator to release the parachute in the usual manner. A short flap 24 on the end of the flap 9 is arranged to be folded over and held by snap fasteners engaging on studs 26 to prevent accidental disengagement of the wire from the grommets 22. The foregoing provisions, for the most part, are in general use and are referred to merely as incidental to the details of the invention to be referred to hereinafter.

The straps 6 of the body harness extend into the pack through notches 27 in the sides of the flap 9 at opposite corners of the back 8 on one side of the pack. The shrouds 3 of the main parachute extend from the straps 6 and are laid back and forth with looped ends tucked in pockets 28 provided in each of two pieces of webbing sewed at intervals onto the sheet 14 leaving slack looped portions to serve as pockets. The shrouds when packed in this manner are held securely enough so that the remaining operations of folding and packing the parachute are not hampered by loose shrouds, but the shrouds are nevertheless very easily disengaged by the pull of the pilot parachute as the latter draws the main parachute from the pack. The arrangement further insures against any likely entangling of the shrouds either through careless packing or when the parachute is released.

The folded main parachute 2 is packed on top of the shrouds 3, and the shrouds 5 from the pilot parachute 4 are laid over it. A partition is provided between the main parachute and the pilot parachute by two tongues 29 on the flaps 9 and 10 arranged to overlap each other at their free edges and overlie the main parachute 2 and a portion of the shrouds 5 of the pilot parachute, as indicated in Fig. 3. The pilot parachute which is usually of a form embodying spring ribs to open automatically on the release of the parachute is thus kept from entanglement either with its shrouds or with the main parachute. The moment the flaps of the pack are released, by the pull of the rip cord, they are thrown open by their elastics and the pilot parachute is free to spring open. The tongues 29 separate with the flaps 9 and 10 and are thus out of the way to permit free exit of the main parachute from the pack.

The pack when opened has no projecting sides or corners that might constitute an obstruction to the free throwing out of the parachute. The flaps 9 and 10 which are folded over first in the closing of the pack include portions which when folded in provide the side and end walls of the pack and when the flaps 11 and 12 are folded over, all portions are very neatly and snugly held in place and the parachute and its shrouds are completely covered and retained. A pair of tongues 30 are provided on the flap 10 which are arranged to be turned in along the sides of the pack to be beneath the side flaps 11 and 12. Apron extensions 31 at each end of the flap 10 are arranged to be folded down over the tongues 30 when the flaps 9 and 10 are folded over the packed parachute. To facilitate tucking the tongues 30 and the aprons 31 in under the flaps 11 and 12 when the latter are folded over, the tongues 30 are provided with shallow pockets or finger holds 32 at their free ends and the aprons 31 are similarly provided with pockets or finger holds 33 at their free edges. The corners and sides of the pack secured with this interlacing arrangement, are practically as good as built up and sewed sides or corners.

The flap 9 has tongues 30' similar to the tongues 30 of the flap 10 and apron extensions 31' to be folded down over the tongues, in a similar manner to the aprons 31. Due however to the fact that the straps 6 extend out through this side of the pack, a special construction is necessitated in the corners on this side and in this case, a second pair of tongues 32 are provided which are laid over the straps 6 at each side of the pack and extend alongside the tongues 30' when the latter are turned in along the sides of the pack. A pair of transverse tongues 33 are provided on the tongues 30' to be laid under the tongues 32. This arrangement affords a sturdy construction and avoids entanglement of the shrouds or the parachute with the straps 6, and no portion of the packed parachute is visible after the pack is closed. The parts forming the corners and sides of this portion of the pack are similarly provided with pockets or finger holds to enable tucking the parts in under overlying parts to produce a snug, trim pack.

Apart from the provision of the reinforcing frame 13 and the stiffening members 15 and 16 which contribute toward making the pack trim and neat appearing, the pack is constructed to be made very snug and tight with all of the flaps drawn in to lay down flat so there is nothing to catch onto things in the wearing of the pack. This desideratum is secured through the cutting on a bias of the sheet of material from which the pack is made. Where the material was cut straight, a serious objection resulted from the fact that the edges of the flaps would be loose and would curl up, despite careful packing and drawing up tightly on the mid portions of the flaps. These edges, besides being unsightly, were a nuisance because they caught onto things and became worn or frayed in the use of the pack. Where the fibres of the material extend diagonally, as is the case where it is cut on a bias, any pull communicated to the mid portion of the flaps in drawing up the same, is transmitted alike through all of the material and the result is that the outermost edges are practically as much under tension as the mid portion and will lie down snugly on the face of the pack, giving a very trim and workmanlike appearance and avoiding any likelihood of catching onto things.

I claim:—

1. In a parachute pack, a main parachute, a pilot parachute, and a container therefor, comprising a back having flaps extending toward each other from opposite sides of said back for releasable connection, a loose tongue attached at one edge to one of said flaps along a line substantially inwardly removed from the free edge of said one flap to provide a place between the said one flap and the tongue for the pilot parachute, supporting harness straps extending from said container, said parachute packed therein having shrouds connected to said straps, and a series of pockets in said back for the orderly reception of loops of said shrouds, and tongues extending from the edges of some of said flaps adjacent the corners of the back to be set up freely to provide corners of the container to approximate a box like structure when the pack is closed, the said tongues opening out loosely in the release of said flaps.

2. In a parachute pack, a main parachute, a pilot parachute, a container having flaps extending toward each other from opposite sides of said container for releasable connection, and a loose tongue attached at one edge to one of said flaps at a point substantially inwardly from the free edge of said one flap to provide a place between the flap and the tongue for the pilot parachute, the latter being covered by the overlapping of said one flap in closing said pack.

3. In a parachute pack, a main parachute, a pilot parachute, a container having flaps extending toward each other from opposite sides of said container for releasable connection, and loose tongues attached to said flaps inwardly from the free edges of said flaps to be laid freely in overlapping relation from opposite sides of said container over said main parachute, said tongues together forming a substantially continuous partition crosswise of the pack, between said main parachute and said pilot parachute, the latter being received in the place left between said tongues and the free portions of said flaps that overlap the tongues.

4. In a parachute pack, a container having releasable flaps, a main parachute, a small spring-opened pilot parachute for withdrawing the same from the container upon the release of said flaps, and tongues on the inside of each of two opposite flaps overlying said main parachute beneath said pilot parachute, withdrawn upon the release of said flaps and the opening of said pilot parachute.

5. In a parachute pack, a main parachute, a spring opened pilot parachute, a container therefor having flaps extending toward each other from opposite sides of said container for releasable connection, and loose tongues attached to the said flaps inwardly from the free edges of said flaps arranged to be laid freely from opposite sides of said container over said main parachute with their free edges in overlapping relation so as to form a complete partition crosswise of said container between said main parachute and said pilot parachute that is quickly removable by the separation of said tongues with said flaps on release thereof, said pilot parachute being received in the space between said tongues and the overlying free ends of said flaps.

6. In a parachute pack, a container, supporting harness straps extending from said container, a parachute packed therein having shrouds connected to said straps, and pockets in said container for tucking said shrouds in packing said parachute.

7. In a parachute pack, a container, supporting harness straps extending from said container, a parachute packed therein having shrouds connected to said straps, and spaced pockets in said container having the bundle of shrouds laid back and forth between the same and tucked therein in packing said parachute.

8. In a parachute pack, a container comprising a back and flaps releasably held in position overlying the back to retain a parachute, a parachute in said container having shrouds connected with a supporting harness, and a plurality of pockets at diametrically opposite sides of said container for receiving looped portions of the bundle of parachute shrouds laid back and forth between the said pockets with said parachute folded and laid over the same.

9. In a parachute pack, a container, supporting harness straps extending from said container, a parachute packed therein having shrouds connected to said straps, and pieces of flexible material secured in said container at spaced intervals to leave loops to serve as pockets to receive said shrouds tucked therein and laid back and forth between the same.

10. In a parachute pack, a container comprising flaps to be placed releasably in overlapping relation to retain a parachute in said container, and finger holds provided on the edges of said flaps to facilitate tucking the same in snugly under overlying flaps in packing said parachute.

11. In a parachute pack, a container comprising a back having end flaps foldable over the back and side flaps foldable from the sides over the end flaps to be held releasably to retain a parachute, tongues at the side edges of one of said end flaps to be turned in along the side edges of said container under said side flaps, and aprons provided by extensions of the side edges of the said end flap adjacent said tongues to be turned in to overlie the tongues under said side flaps to complete the corners of said container to retain the parachute therein.

12. In a parachute pack, a container comprising a back having end flaps foldable over the back and side flaps foldable from the sides over the end flaps to be held releasably to retain a parachute, tongues at the side edges of one of said end flaps to be turned in along the side edges of said container under said side flaps, aprons provided by extensions of the side edges of the said end flap adjacent said tongues to be turned in to overlie the tongues under said side flaps and thereby complete the corners of said container to retain the parachute therein, and finger pockets on the edges of said tongues and aprons to facilitate tucking the same in under the side flaps in packing said parachute.

13. In a parachute pack, a parachute, a container having flaps to fold over the same and retain the parachute between them and the back of the container, and pockets in said back to receive looped ends of the shrouds of said parachute in orderly non-tangling arrangement, the canopy of said parachute being folded and packed over the pockets containing said shrouds and out of danger of entanglement therewith.

14. In a parachute pack, a main parachute, a container having flaps to fold over the same and retain the parachute between them and the back of the container, pockets in said back permitting an orderly non-tangling arrangement and packing of looped ends of the shrouds of said parachute, the canopy of said parachute being folded and packed over the pockets containing said shrouds and out of danger of entanglement therewith, a pilot parachute to overlie said main parachute, and a loose tongue attached inwardly of the end of one of said flaps to be interposed between said parachutes, said pilot parachute being contained between said tongue and the overlying flaps.

15. In a parachute pack, flexible fabric material cut to provide a rectangular back and four flaps to be folded over about a parachute and held releasably, a reinforcing frame defining the shape of the back, and stiffening means provided in said flaps for further defining and holding the shape of the rest of the pack.

16. In a parachute container, a back portion and a plurality of flaps therefor, some of said flaps being of triangular shape, the material of said back and triangular sides being arranged on the bias so that a pull on the outer apex of a triangular flap is uniformly distributed to the back portion.

17. In a parachute pack, a container, a back portion, two opposite triangular side flaps and two substantially rectangular flaps attached to the edges of said back portion, a main parachute held in said container, a pilot parachute therefor, and a tongue attached to a rectangular flap to be applied in overlapping relation across the main parachute and between the pilot and the main parachute, said triangular sides being applied on top of the rectangular sides to retain the whole in packed relation.

18. In a parachute container, a back portion and a plurality of flaps therefor, some of said flaps being of triangular shape, the material of said back and triangular sides being arranged on the bias so that a pull on the outer apex of a triangular flap is uniformly distributed to the back portion, a rigid form defining frame for said back portion and rigidifying means for each of said triangular flaps.

19. In a parachute pack, a container comprising an approximately rectangular back having flaps at the edges to fold over and be releasably connected together to retain a parachute, and tongues on certain of said flaps to be set up freely at the corners of said container to approximate a box-like structure when the pack is closed, the said tongues opening out loosely in the release of said flaps.

20. In a parachute pack, a container comprising a back having flaps at the marginal edges that fold over and are releasably connected to retain a parachute, and means in the nature of tongues capable of being set to form closed corners between said flaps that open out freely in the release of said flaps so that the opened pack is flat with nothing projecting from the plane of the back.

21. In a parachute pack, a container comprising a back having flaps at the marginal edges that fold over and are releasably connected to retain a parachute, and means providing built-up corners between said flaps that remain intact with the pack closed but are disrupted upon the release of said flaps.

22. In a parachute pack, a container comprising a back having flaps at the marginal edges that fold over and are releasably connected to retain a parachute, and means to be built up in the corners of the pack between the adjacent flaps to complete the enclosure of the parachute.

23. In a parachute pack, a parachute, a container therefor having flaps releasably connected overlapping the back of the container to retain the parachute, supporting harness straps entering said container at opposite sides through notches in the opposed edges of one of said flaps, and pockets in said container permitting orderly non-tangling arrangement and packing of the shrouds of said parachute, two strands of said shrouds being led out on opposite sides of said container to said harness straps for connection and said parachute being folded and laid over said pocketed shrouds.

In testimony whereof I affix my signature.

GUY M. BALL.

DISCLAIMER 1,554,192.—*Guy M. Ball*, Dayton, Ohio. PARACHUTE PACK. Patent dated September 22, 1925. Disclaimer filed August 14, 1930, by the assignee, *Irving Air Chute Co. Inc.*

Hereby enters its disclaimer to claim 6 of said Letters Patent, which is in the following words, to wit:

"In a parachute pack, a container, supporting harness straps extending from said container, a parachute packed therein having shrouds connected to said straps, and pockets in said container for tucking said shrouds in packing said parachute."

Your petitioner also hereby enters its disclaimer, on behalf of its interest in said Letters Patent, to claim 13 of said Letters Patent, which is in the following words, to wit:

"In a parachute pack, a parachute, a container having flaps to fold over the same and retain the parachute between them and the back of the container, and pockets in said back to receive looped ends of the shrouds of said parachute in orderly non-tangling arrangement, the canopy of said parachute being folded and packed over the pockets containing said shrouds and out of danger of entanglement therewith."

Your petitioner does not otherwise relinquish the right to protection as afforded by the subject matter of any other claim or claims in said patent.

[*Official Gazette September 9, 1930*]